(12) United States Patent
Meng et al.

(10) Patent No.: US 12,118,301 B2
(45) Date of Patent: Oct. 15, 2024

(54) METHOD AND APPARATUS FOR GENERATING HIDDEN STATE IN RECURRENT NEURAL NETWORK FOR LANGUAGE PROCESSING

(71) Applicant: TENCENT TECHNOLOGY (SHENZHEN) COMPANY LIMITED, Shenzhen (CN)

(72) Inventors: Fandong Meng, Shenzhen (CN); Jinchao Zhang, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 517 days.

(21) Appl. No.: 17/332,318

(22) Filed: May 27, 2021

(65) Prior Publication Data
US 2021/0286953 A1    Sep. 16, 2021

Related U.S. Application Data

(63) Continuation of application No. PCT/CN2020/081177, filed on Mar. 25, 2020.

(30) Foreign Application Priority Data

Apr. 17, 2019    (CN) .......................... 201910309929.5

(51) Int. Cl.
*G06F 40/30*      (2020.01)
*G06F 18/10*      (2023.01)
(Continued)

(52) U.S. Cl.
CPC .............. *G06F 40/20* (2020.01); *G06F 18/10* (2023.01); *G06F 18/25* (2023.01); *G06F 40/40* (2020.01); *G06N 3/048* (2023.01)

(58) Field of Classification Search
None
See application file for complete search history.

(56) References Cited

U.S. PATENT DOCUMENTS

| 11,461,638 B2* | 10/2022 | Kim ...................... G06N 3/044 |
| 2018/0129742 A1* | 5/2018 | Li ......................... G06N 3/044 |

(Continued)

FOREIGN PATENT DOCUMENTS

| CN | 108595601 A | 9/2018 |
| CN | 109472031 A | 3/2019 |

(Continued)

OTHER PUBLICATIONS

Vaswani, Ashish, et al. "Attention is all you need." Advances in neural information processing systems 30 (2017) (Year: 2017).*

(Continued)

*Primary Examiner* — Seong-Ah A Shin
(74) *Attorney, Agent, or Firm* — ANOVA LAW GROUP, PLLC

(57) ABSTRACT

A method and apparatus for generating a hidden state in a recurrent neural network for language processing are provided. The method includes: generating regional word vectors of at least two dimensions of a target word vector inputted at a first moment; combining the regional word vectors to obtain combined regional word vectors of at least two dimensions; performing aggregation transformation processing on the combined regional word vectors based on a feedforward neural network, to obtain an aggregated word vector corresponding to the target word vector; and generating a target hidden state corresponding to the target word vector based on the aggregated word vector.

18 Claims, 8 Drawing Sheets

(51) Int. Cl.
  G06F 18/25    (2023.01)
  G06F 40/20    (2020.01)
  G06F 40/289   (2020.01)
  G06F 40/35    (2020.01)
  G06F 40/40    (2020.01)
  G06N 3/048    (2023.01)

(56) References Cited

U.S. PATENT DOCUMENTS

| | | | |
|---|---|---|---|
| 2018/0189269 A1* | 7/2018 | Quirk | G06F 40/289 |
| 2019/0251165 A1* | 8/2019 | Bachrach | G06N 3/084 |
| 2019/0278835 A1* | 9/2019 | Cohan | G06F 40/289 |
| 2020/0073937 A1* | 3/2020 | Zhao | G06F 40/30 |
| 2020/0117856 A1* | 4/2020 | Kumar Karn | G06F 40/30 |
| 2020/0250265 A1* | 8/2020 | Yang | G06F 40/35 |
| 2021/0150151 A1* | 5/2021 | Xu | G06N 3/044 |
| 2021/0319314 A1* | 10/2021 | Perez | G06N 3/044 |

FOREIGN PATENT DOCUMENTS

| | | |
|---|---|---|
| CN | 109492157 A | 3/2019 |
| CN | 110162783 A | 8/2019 |
| WO | 2014203042 A1 | 12/2014 |

OTHER PUBLICATIONS

Nallapati, Ramesh, Feifei Zhai, and Bowen Zhou. "Summarunner: A recurrent neural network based sequence model for extractive summarization of documents." Proceedings of the AAAI conference on artificial intelligence. vol. 31. No. 1. 2017. (Year: 2017).*

The European Patent Office (EPO) The Extended European Search Report for 20790836.9 May 13, 2022 11 Pages.

Fandong Meng et al., "Multi-Zone Unit for Recurrent Neural Networks," arXiv:1911.07184v1, Nov. 17, 2019. 8 pages.

Anonymous, "Feedforward neural network," Wikipedia, Apr. 10, 2019 (Apr. 10, 2019), pp. 1-4, Retrieved from the Internet: URL: https://en.wikipedia.org/w/index.php?title=Feedforwardneural_network&oldid=891888163, [retrieved on Jul. 16, 2021]. 4 pages.

Anonymous: "Capsule neural network," Wikipedia, Mar. 5, 2019 (Mar. 5, 2019), Retrieved from the Internet: URL: https://en.wikipedia.org/w/index.php?title=Capsule_neural_network&oldid=886282738, [retrieved on May 2, 2022]. 7 pages.

Hu Xu et al., "Double Embeddings and CNN-based Sequence Labeling for Aspect Extraction," arXiv:1805.04601v1, May 11, 2018. 7 pages.

Yequan Wang et al., "Sentiment Analysis by Capsules," The Web Conference 2018, International World Wide Web Conferences Steering Committee, Republic and Canton of Genevaswitzerland, Apr. 2018, pp. 1165-1174. 10 pages.

The World Intellectual Property Organization (WIPO) International Search Report for PCT/CN2020/081177 Jun. 30, 2020 5 Pages (including translation).

Razvan Pascanu et al., "How to construct deep recurrent neural networks," in ICLR, 2014. 13 pages.

Antonio Valerio Miceli Barone et al., "Deep architectures for neural machine translation," in WMT, 2017. 9 pages.

Guoqiang Hong et al., "Long Short-Term Attention," in CoRR, abs/1810.12752, 2019. 10 pages.

Guoqiang Zhong et al., "Recurrent attention unit," in CoRR, abs/1810.12754, 2018. 8 pages.

Fandong Meng et al., "DTMT: A novel deep transition architecture for neural machine translation," in AAAI, 2019, pp. 224-231. 8 pages.

Kyunghyun Cho et al., "Learning phrase representations using RNN encoder-decoder for statistical machine translation," in EMNLP, 2014, pp. 1724-1734. 11 pages.

Sara Sabour et al., "Dynamic routing between capsules," in Advances in Neural Information Processing Systems, 2017. 11 pages.

Ashish Vaswani et al., "Attention is all you need," in NIPS, 2017. 15 pages.

Razvan Pascanu et al., "How to construct deep recurrent neural networks," in Proceedings of ICLR, 2014. 13 pages.

* cited by examiner $$A = \begin{bmatrix} W_{11} & W_{12} & \cdots & W_{1N} \\ W_{21} & W_{22} & \cdots & W_{2N} \\ \cdots & \cdots & \cdots & \cdots \\ W_{N1} & W_{N2} & \cdots & W_{NN} \end{bmatrix}$$

$$D = \begin{bmatrix} D_{11} & 0 & 0 & \cdots & 0 & 0 \\ 0 & D_{22} & 0 & \cdots & 0 & 0 \\ \cdots & \cdots & \cdots & \cdots & \cdots & \cdots \\ 0 & 0 & 0 & \cdots & 0 & D_{NN} \end{bmatrix}$$

| Algorithm 1 Dynamic routing algorithm |
| --- |
| Input: low-level capsule Z, quantity of iterations T |
| Output: high-level capsule |
| 901:     for $Z_i \in Z \wedge O_j \in O$ do |
| 902:         $b_{ij} \leftarrow 0$ |
| 903:         $Z_{j|i} = W_{ij}^c Z_i$ |
| 904:     end for |
| 905:     for $t=1 \cdots\cdots T$ do |
| 906:         $C_{ij} \leftarrow \mathrm{softmax}(b_i)$ |
| 907:         $S_j \leftarrow \sum_i C_{ij} Z_{j|i}$ |
| 908:         $O_j \leftarrow \mathrm{squash}(S_j)$ |
| 909:         $b_{ij} \leftarrow b_{ij} + Z_{j|i} \cdot O_j$ |
| 910:     end for |

FIG. 9

US 12,118,301 B2

METHOD AND APPARATUS FOR GENERATING HIDDEN STATE IN RECURRENT NEURAL NETWORK FOR LANGUAGE PROCESSING

CROSS-REFERENCES TO RELATED APPLICATIONS

This application is a continuation application of PCT Patent Application No. PCT/CN2020/081177, entitled "METHOD AND DEVICE FOR GENERATING HIDDEN STATE IN RECURRENT NEURAL NETWORK FOR LANGUAGE PROCESSING" and filed on Mar. 25, 2020, which claims priority to Chinese Patent Application No. 201910309929.5, entitled "METHOD AND APPARATUS FOR GENERATING HIDDEN STATE IN RECURRENT NEURAL NETWORK FOR LANGUAGE PROCESSING" and filed on Apr. 17, 2019, the entire contents of both of which are incorporated herein by reference.

FIELD OF THE TECHNOLOGY

The present disclosure relates to the field of computer technologies, and in particular, to a method and apparatus for generating a hidden state in a recurrent neural network for language processing, a computer-readable storage medium, and a computer device.

BACKGROUND OF THE DISCLOSURE

With the development of computer technologies, a natural language processing (NLP) technology has emerged. The NLP technology realizes the "communication with a computer by using a natural language" that people have long been pursuing. However, for the NLP technology, processing variable-length word sequences is still a big challenge.

Therefore, recurrent neural networks (RNN) have emerged. The RNNs are a type of recursive neural networks in which sequence data is used as an input, recursion is performed in a sequence evolution direction, and all nodes (recurrent units) are in a chain connection. The emergence of the recurrent neural networks overcomes the challenge in processing of variable-length word sequences.

However, all existing recurrent neural networks use a combination of calculations in a single space to generate a hidden state at each moment. For example, only a combination of a word vector at a first moment and a hidden state at a previous moment in a single space is used to generate a hidden state at the first moment, causing a low rate for capturing complex linguistic laws.

SUMMARY

The present disclosure provides a method and apparatus for generating a hidden state in a recurrent neural network for language processing, a computer-readable storage medium, and a computer device. A rate for capturing complex linguistic laws is high in the technical solutions. The technical solutions are as follows:

According to an aspect, a method for generating a hidden state in a recurrent neural network for language processing is provided, applied to a computer device, the method including: generating regional word vectors of at least two dimensions of a target word vector inputted at a first moment: combining the regional word vectors to obtain combined regional word vectors of at least two dimensions: performing aggregation transformation processing on the combined regional word vectors based on a feedforward neural network, to obtain an aggregated word vector corresponding to the target word vector: and generating a target hidden state corresponding to the target word vector based on the aggregated word vector.

According to another aspect, an apparatus for generating a hidden state in a recurrent neural network for language processing is provided, the apparatus including: a regional word vector generation module, configured to generate regional word vectors of at least two dimensions of a target word vector inputted at a first moment: a regional word vector combination module, configured to combine the regional word vectors to obtain combined regional word vectors of at least two dimensions; an aggregation transformation processing module, configured to perform aggregation transformation processing on the combined regional word vectors based on a feedforward neural network, to obtain an aggregated word vector corresponding to the target word vector: and a target hidden state generation module, configured to generate a target hidden state corresponding to the target word vector based on the aggregated word vector.

According to another aspect, a non-transitory computer-readable storage medium is provided, storing a computer program, the computer program, when executed by a processor, causing the processor to perform: generating regional word vectors of at least two dimensions of a target word vector inputted at a first moment: combining the regional word vectors to obtain combined regional word vectors of at least two dimensions: performing aggregation transformation processing on the combined regional word vectors based on a feedforward neural network, to obtain an aggregated word vector corresponding to the target word vector: and generating a target hidden state corresponding to the target word vector based on the aggregated word vector.

According to another aspect, a computer device is provided, including a memory and a processor, the memory storing a computer program, the computer program, when executed by the processor, causing the processor to perform the method for generating a hidden state in a recurrent neural network for language processing described in the previous aspect and any one of optional embodiments thereof.

As can be seen from the foregoing technical solutions, the embodiments of the present disclosure have at least the following advantages:

In the method, regional word vectors of at least two dimensions of a target word vector inputted at a first moment are generated, so that the target word vector of a single dimension corresponds to the regional word vectors of a plurality of dimensions: regional combination is performed on the regional word vectors to obtain combined regional word vectors of at least two dimensions: then aggregation transformation processing is performed on the combined regional word vectors based on a feedforward neural network, to obtain an aggregated word vector corresponding to the target word vector, so that a target word vector at each moment corresponds to an aggregated word vector, thereby generating a target hidden state corresponding to the target word vector based on the aggregated word vector. In addition, since the aggregated word vector is obtained by performing multi-dimensional conversion processing on the target word vector, for the target hidden state generated by using the aggregated word vector, a rate for capturing complex linguistic laws is high.

In other words, according to the method, the aggregated word vector after multi-dimensional conversion is obtained by performing a deep multi-region combination calculation on the target word vector, thereby enhancing linguistic laws captured in the word vectors, for example, enhancing the long-distance dependence in the word vectors, so that complex linguistic laws can be captured with a greater probability by using the target hidden state generated based on the aggregated word vector.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 9 is an exemplary diagram of a method for calculating regional word vectors according to an exemplary embodiment of the present disclosure.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are merely used to explain the present disclosure but are not intended to limit the present disclosure.

Figure 1:
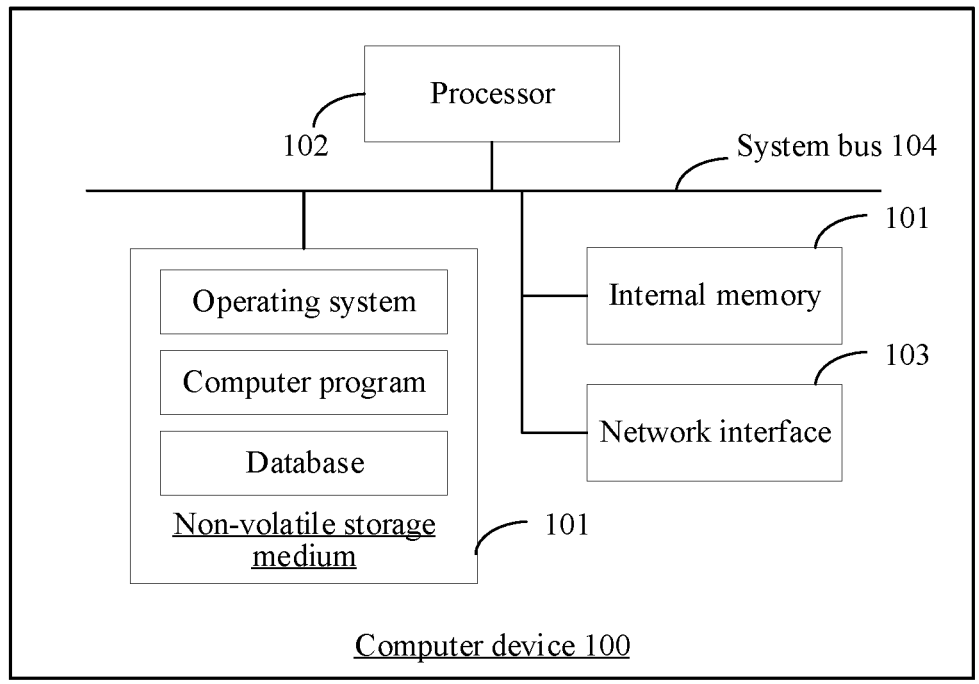
FIG. 1 is a structural block diagram of a computer device according to an exemplary embodiment of the present disclosure.

A method for generating a hidden state in a recurrent neural network for language processing provided in the present disclosure may be applicable to a computer device 100 shown in FIG. 1. The computer device 100 includes a memory 101 and a processor 102. In some embodiments, the memory 101 may include a non-volatile storage medium and an internal memory. The memory 101 stores a computer program. The computer program, when executed by the processor 102, can implement the method for generating a hidden state in a recurrent neural network for language processing provided in the present disclosure. In some embodiments, the computer device 100 further includes a network interface 103. The network interface 103 is configured to connect the computer device 100 to a wired or wireless network. In some embodiments, the computer device 100 further includes a system bus 104, where the memory 101 is electrically connected to the processor 102 and the network interface 103 respectively by using the system bus 104. The computer device 100 may be a terminal or a server. It can be understood that when the computer device 100 is a terminal, the computer device 100 may further include a display screen, an input apparatus, and the like. The terminal may be, but not limited to, a personal computer, a notebook computer, a smartphone, a tablet computer, and a portable wearable device. The server may be implemented by an independent server or a server cluster including a plurality of servers.

Figure 2:
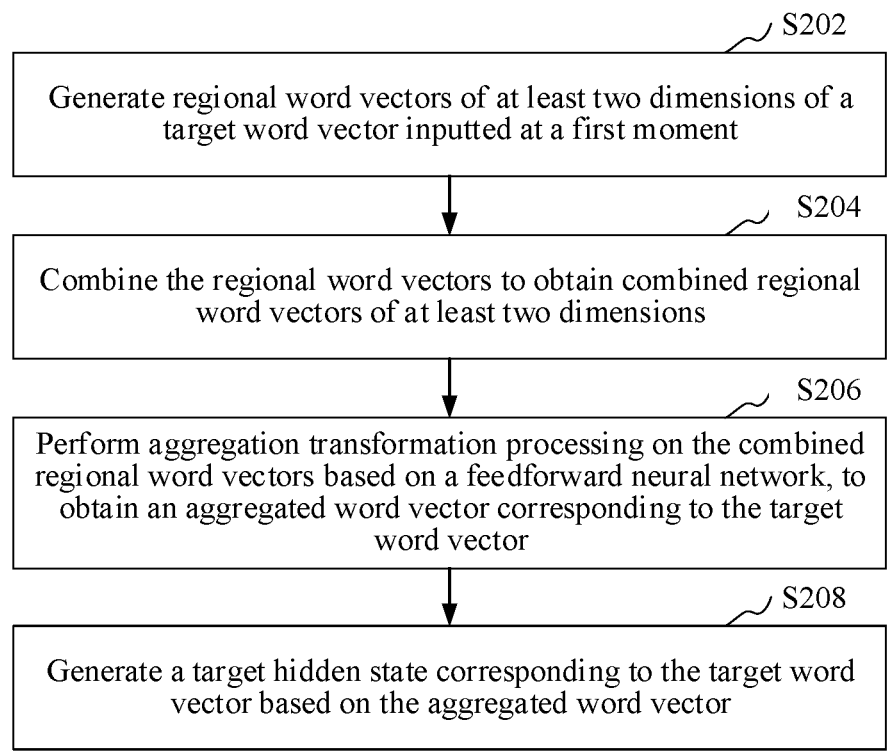
FIG. 2 is a flowchart of a method for generating a hidden state in a recurrent neural network for language processing according to an exemplary embodiment of the present disclosure.

As shown in FIG. 2, in an embodiment, a method for generating a hidden state in a recurrent neural network for language processing is provided. In one embodiment, description is made mainly by using an example in which the method is applied to the computer device in FIG. 1. Referring to FIG. 2, the method for generating a hidden state in a recurrent neural network for language processing specifically includes the following steps:

S202. Generate regional word vectors of at least two dimensions of a target word vector inputted at a first moment.

The word vectors refer to real-number vectors of corresponding words in a predefined vector space. For example, a real-number vector of "dog" in the predefined vector space may be (0.2 0.2 0.4), then (0.2 0.2 0.4) is a word vector of "dog". The target word vector refers to a word vector inputted at the first moment. The regional word vectors refer to word vectors of various different dimensions corresponding to a word vector of one dimension. The first moment is a moment at which the target word vector is inputted. For example, the first moment may include the current moment, that is, the moment currently indicated by the clock.

Specifically, when the computer device detects that the target word vector is inputted at the first moment, the computer device reads the target word vector inputted at the first moment, and triggers a regional word vector generation instruction of the target word vector. The computer device converts the low-dimensional target word vector into regional word vectors of at least two dimensions according to the regional word vector generation instruction. In this way, a target word vector inputted by the computer device at each moment corresponds to regional word vectors of at least two dimensions.

In an embodiment, target word vectors inputted by the computer device at T moments are a vector sequence $X=\{X_1, X_2, \ldots, X_T\}$ as a whole, where $X_1$ is a first target word vector in the vector sequence X, and $X_1$ represents a word vector inputted by the computer device at a first moment; $X_2$ is a second target word vector in the vector sequence X, and $X_2$ represents a word vector inputted by the computer device at a second moment; . . . ; and $X_T$ is a $T^{th}$ target word vector in the vector sequence $X_T$, and $X_T$ represents a word vector inputted by the computer device at a $T^{th}$ moment, T being a positive integer. At each moment in the vector sequence X, the computer device generates regional word vectors of at least two dimensions of a target word vector inputted at the moment.

In an embodiment, each word vector in the vector sequence $X=\{X_1, X_2, \ldots, X_T\}$ is obtained by converting text in advance. For example, when the computer device is a terminal, a social application for communication is installed in the computer device, and a sub-application for man-machine dialogs runs in the social application for communication. When detecting that the sub-application for man-machine dialogs receives variable-length voice information, the computer device converts voice information received at each moment into text information, and maps the text information into a target word vector. In this way, the variable-length voice information finally forms a vector sequence, and the vector sequence includes the target word vector corresponding to the text information of the voice information received at each moment.

Certainly, when the computer device is a server, the server may receive target word vectors that have been obtained through conversion by other terminals, and generate regional word vectors of at least two dimensions of a target word vector inputted at each moment. Or when the computer device is a server, the server may alternatively directly receive variable-length voice information received by other terminals by using a sub-application for man-machine dialogs, convert voice information received at each moment into text information, and map the text information into a target word vector. In this way, the variable-length voice information finally forms a vector sequence, the vector sequence includes the target word vector corresponding to the text information of the voice information received at each moment, and regional word vectors of at least two dimensions of the target word vector inputted at each moment are generated.

In one embodiment, the computer device may receive a variable-length text information, and determine a vector sequence from the variable-length text information.

In an embodiment, the regional word vector generation instruction may carry a first preset dimension. When converting the low-dimensional target word vector into the regional word vectors of at least two dimensions according to the regional word vector generation instruction, the computer device may convert the low-dimensional target word vector into regional word vectors of the first preset dimension according to the first preset dimension.

For example, the first moment is T, the first preset dimension is N, and the computer device detects the input of the target word vector $X_T$ at a first moment T. Then the computer device needs to convert the target word vector $X_T$ of a single dimension into regional word vectors of N dimensions. The computer device may generate N regional word vectors $Z=\{Z_1, Z_2, \ldots, Z_N\}$ of the target word vector $X_T$, where all of $Z_1$ to $Z_N$ are regional word vectors of the target word vector $X_T$, N being greater than 1.

S204. Combine the regional word vectors to obtain combined regional word vectors of at least two dimensions.

The combined regional word vectors refer to word vectors obtained by performing a combination calculation on the regional word vectors. For example, the target word vector has regional word vectors of N dimensions, then the computer device may obtain combined regional word vectors of J dimensions after performing a combination calculation on the regional word vectors of N dimensions, where J is greater than or equal to 2.

Specifically, a regional vector combination manner is preset in the computer device. After generating the regional word vectors of the target word vector, the computer device obtains the preset regional vector combination manner, the regional vector combination manner including a second preset dimension. The computer device performs a combination calculation on the regional word vectors of the target word vector in the preset regional vector combination manner, to obtain combined regional word vectors of the second preset dimension. The regional vector combination manner refers to a manner of performing a combination calculation on the regional word vectors.

S206. Perform aggregation transformation processing on the combined regional word vectors based on a feedforward neural network, to obtain an aggregated word vector corresponding to the target word vector.

The feedforward neural network is a neural network in which neurons are arranged hierarchically. The aggregation transformation processing refers to a process of performing aggregation processing and transformation processing on the combined regional word vectors. The aggregated word vector refers to a word vector obtained after aggregation processing and transformation processing are performed on the combined regional word vectors.

Specifically, the computer device may perform one transformation on the combined regional word vectors respectively based on the feedforward neural network, to obtain intermediate regional word vectors of the same dimensions as the combined regional word vectors. For example, the target word vector has combined regional word vectors $O=\{O_1, O_2, \ldots, O_J\}$ of J dimensions, then when the computer device first performs one transformation on the combined regional word vectors based on the feedforward neural network, intermediate regional word vectors $F=\{F_1, F_2, \ldots, F_J\}$ of J dimensions may alternatively be obtained. The computer device performs aggregation processing on the obtained intermediate regional word vectors to obtain an intermediate aggregated word vector. The computer device may perform one linear transformation on the obtained intermediate aggregated word vector, and the aggregated word vector corresponding to the target word vector can be obtained.

S208. Generate a target hidden state corresponding to the target word vector based on the aggregated word vector.

The hidden state refers to a hidden state outputted by a hidden layer of the recurrent neural network, and the hidden state refers to a system status of the recurrent neural network. The target hidden state refers to a system status of the recurrent neural network at the first moment.

Specifically, the computer device may obtain a historical hidden state of a historical word vector at a previous moment, and the computer device may add the aggregated word vector of the target word vector based on the historical hidden state to calculate the target hidden state of the target word vector, to generate the target hidden state of the target word vector. It can be understood that the historical hidden state of the historical word vector at the previous moment is also generated based on the aggregated word vector of the historical word vector, and the aggregated word vector is obtained by performing multi-dimensional conversion processing on the historical word vector. In some embodiments, the previous moment may refer to a moment immediately preceding the first moment.

In the foregoing method for generating a hidden state in a recurrent neural network for language processing, the regional word vectors of at least two dimensions of the target word vector inputted at the first moment are generated, so that the target word vector of a single dimension corresponds to the regional word vectors of a plurality of dimensions, and regional combination is performed on the regional word vectors to obtain the combined regional word vectors of at least two dimensions. Then aggregation transformation processing is performed on the combined regional word vectors based on the feedforward neural network, to obtain the aggregated word vector corresponding to the target word vector.

By using the solutions provided in the present disclosure, a target word vector at each moment has a corresponding aggregated word vector, so that a target hidden state corresponding to the target word vector can be generated based on the aggregated word vector. Since the aggregated word vector is obtained by performing multi-dimensional conversion processing on the target word vector, for the target hidden state generated by using the aggregated word vector, a rate for capturing complex linguistic laws is high. For example, when processing tasks such as handwriting recognition, sequence labeling, sentiment analysis, language model training, and machine translation, even when encountering long-distance dependent language structures, the computer device can complete the tasks efficiently. In some embodiments, the target hidden state is used as an input for a final/last prediction layer of an artificial intelligence (AI) model of a task such as handwriting recognition, sequence labeling, sentiment analysis, language model training, and machine translation, and the final predication layer can output a determination result of the task based on the inputted target hidden state and a Softmax function.

In an embodiment, the generating regional word vectors of at least two dimensions of a target word vector inputted at a first moment includes: obtaining at least two first weight matrices, each of the first weight matrices being used for generating a corresponding regional word vector; determining the target word vector inputted at the first moment, and obtaining a historical hidden state corresponding to a historical word vector at a previous moment; and generating the regional word vectors of at least two dimensions of the target word vector based on the first weight matrices and the historical hidden state.

The first weight matrix refers to a weight parameter in the form of a matrix that is trained along with the system, and is used for generating a corresponding regional word vector. In other words, the first weight matrix is a system parameter in the form of a matrix obtained by training the system by using sample data. The historical word vector refers to a word vector inputted by the computer device at the previous moment of the first moment. The historical hidden state refers to a hidden state corresponding to the word vector inputted by the computer device at the previous moment of the first moment.

Specifically, when the computer device detects that the target word vector is inputted at the first moment, the computer device reads the target word vector inputted at the first moment, and triggers a regional word vector generation instruction of the target word vector. The computer device obtains the first weight matrices used for generating the regional word vectors according to the regional word vector generation instruction, and a quantity of the obtained first weight matrices is the same as a quantity of dimensions of the regional word vectors that the computer device needs to generate.

For example, the first preset dimension of the regional word vectors that the computer device needs to be generate is N, then the quantity of the first weight matrices obtained by the computer device is N. When the computer device generates a regional word vector of each dimension, there is a corresponding first weight matrix: when the computer device generates a regional word vector $Z_1$ of a first dimension, there is a corresponding first weight matrix $W_1$; when the computer device generates a regional word vector $Z_2$ of a second dimension, there is a corresponding first weight matrix $W_2$; . . . ; and when the computer device generates a regional word vector $Z_N$ of an $N^{th}$ dimension, there is a corresponding first weight matrix $W_N$.

The computer device determines the target word vector inputted at the first moment, and obtains the historical hidden state corresponding to the historical word vector inputted by the computer device at the previous moment of the first moment. It can be understood that the previous moment is not necessarily a moment closely adjacent to the first moment, and the previous moment is a moment corresponding to a previous input of a word vector relative to the current input of the target word vector by the computer device.

For example, target word vectors inputted by the computer device at T moments are a vector sequence $X=\{X_1, X_2, \ldots, X_T\}$ as a whole, where $X_1$ represents a word vector inputted by the computer device at a first moment, and $X_2$ represents a word vector inputted by the computer device at a second moment. There may be a long time interval or only a short time interval between the first moment and the second moment, so that the first moment and the second moment are not necessarily closely adjacent moments corresponding to a timetable.

The computer device may generate regional word vectors of the first preset dimension based on the obtained historical hidden state and a first preset quantity of first weight matrices. The first preset quantity is the same as the quantity of the first preset dimensions. The regional word vectors of the first preset dimension as a whole may be a regional word vector matrix. For example, the computer device needs to convert the target word vector $X_T$ into regional word vectors of N dimensions, then the obtained regional word vectors of N dimensions may be represented as a regional word vector matrix $$\begin{bmatrix} Z_1 \\ Z_2 \\ \vdots \\ Z_N \end{bmatrix}.$$

All of $Z_1$ to $Z_N$ in the regional word vector matrix are regional word vectors of the target word vector $X_T$.

In the foregoing embodiment, the computer device directly uses the first weight matrices used for generating the corresponding regional word vectors to efficiently convert the target word vector of a single dimension into the regional word vectors of at least two dimensions. In addition, the regional word vectors of at least two dimensions are generated based on the historical hidden state at the previous moment, so that the obtained regional word vectors are more accurate.

In an embodiment, the generating the regional word vectors of at least two dimensions of the target word vector based on the first weight matrices and the historical hidden state includes: concatenating the target word vector and the historical hidden state to obtain a concatenated word vector; and generating a regional word vector matrix according to the concatenated word vector and the first weight matrices, the regional word vector matrix including the regional word vectors of at least two dimensions.

Specifically, the hidden state at each moment generated by the computer device is in the form of a vector. Therefore, after determining the target word vector and obtaining the historical hidden state corresponding to the historical word vector at the previous moment, the computer device may concatenate the target word vector at the first moment and the historical hidden state at the previous moment to obtain the concatenated word vector. For example, the target word vector includes 8 vector elements, and the historical hidden state includes 5 vector elements. After the computer device directly concatenates the target word vector and the historical hidden state, the obtained concatenated word vector includes 13 vector elements. The computer device respectively multiplies the obtained concatenated word vector with the first weight matrices, to obtain a regional word vector matrix. The regional word vector matrix includes regional word vectors of a plurality of dimensions.

In an embodiment, the concatenating the target word vector and the historical hidden state may be represented as $[X_t, h_{t-1}]$, where $X_t$ is the target word vector inputted at the first moment by the computer device, and $h_{t-1}$ is the historical hidden state corresponding to the historical word vector at the previous moment of the first moment. Then the computer device may generate the regional word vectors of at least two dimensions of the target word vector according to the following formula: $Z_1 = W_1 [X_t, h_{t-1}]$.

Wi represents the first weight matrix. For example, the computer device needs to generate N regional word vectors, then i is 1 to N, $Z_1$ is $Z_1$ to $Z_N$, and $W_1$ is $W_1$ to $W_N$. It can be understood that when $Z_1$ is calculated, $Z_1 = W_1 [X_t, h_{t-1}]$ is $Z_1 = W_1 [X_t, h_{t-1}]$; when $Z_2$ is calculated, $Z_1 = W_1 [X_t, h_{t-1}]$ is $Z_2 = W_2 [X_t, h_{t-1}]$; . . . ; and when $Z_N$ is calculated, $Z_1 = W_1 [X_t, h_{t-1}]$ is $Z_N = W_N [X_t, h_{t-1}]$.

In this way, the computer device can obtain a regional word vector matrix $$\begin{bmatrix} Z_1 \\ Z_2 \\ \vdots \\ Z_N \end{bmatrix}.$$

1 to N respectively representing dimensions to which the corresponding regional word vectors $Z_1$ to $Z_N$ belong, t being an integer greater than 1.

It can be understood that each regional word vector in the regional word vector matrix is of a different dimension, each regional word vector includes a plurality of vector elements, and each vector element is a matrix element of the dimension to which the regional word vector belongs. For example, $Z_1$ includes 3 vector elements: 0.3, 0.8 and 0.7, then 0.3 is a matrix element $Z_{11}$ of the first dimension to which $Z_1$ belongs, 0.8 is a matrix element $Z_{12}$ of the first dimension to which $Z_1$ belongs, and 0.7 is a matrix element $Z_{13}$ of the first dimension to which $Z_1$ belongs. By using an example in which each regional word vector includes 3 vector elements, the regional word vector matrix may be specifically represented as $$\begin{bmatrix} Z_{11} & Z_{12} & Z_{13} \\ Z_{21} & Z_{22} & Z_{23} \\ \cdots & \cdots & \cdots \\ Z_{N1} & Z_{N2} & Z_{N3} \end{bmatrix}.$$

In the foregoing embodiment, the computer device directly concatenates the target word vector and the hidden state at the previous moment to obtain the concatenated word vector, and directly multiplies the concatenated word vector with at least two first weight matrices respectively, to obtain the regional word vectors of at least two dimensions more efficiently and quickly.

Figure 3:
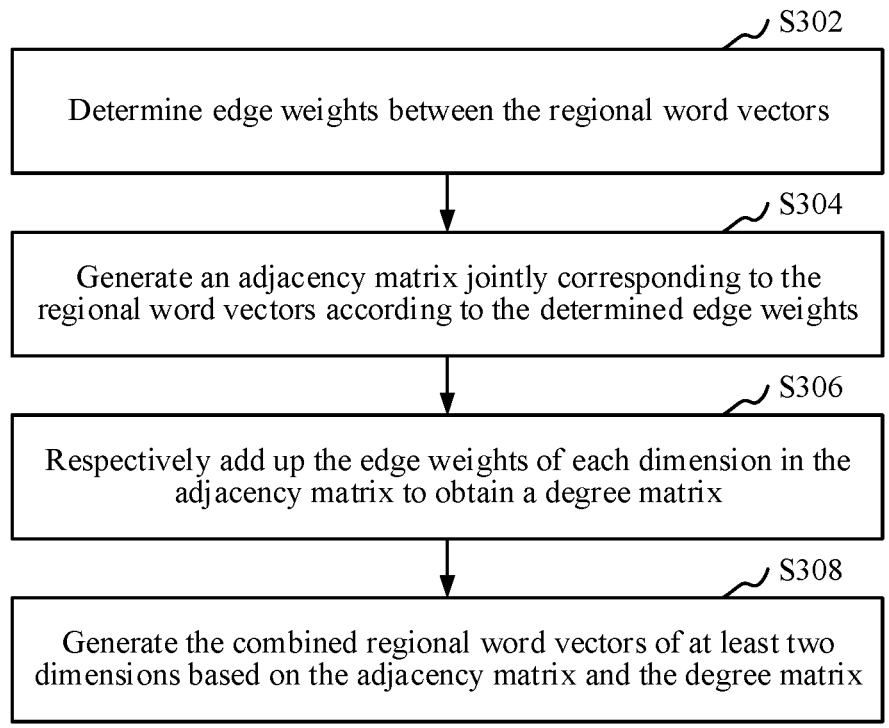
FIG. 3 is a flowchart of a method for generating a hidden state in a recurrent neural network for language processing according to another exemplary embodiment of the present disclosure.

In an embodiment, as shown in FIG. 3, the combining the regional word vectors to obtain combined regional word vectors of at least two dimensions includes:

S302. Determine edge weights between the regional word vectors. For example, each edge weight may correspond to two of the regional word vectors.

The edge weights refer to weights of edges used for connecting vector nodes when the regional word vectors are used as vector nodes.

Specifically, the regional vector combination manner preset by the computer device may be a regional vector combination manner based on graph convolution. The computer device determines the regional word vectors as vector nodes in the regional vector combination manner based on graph convolution. There are connected edges between the vector nodes. A graph G=(V,E) is constructed, where V represents a vector node set, and E represents an edge set.

Figure 4:
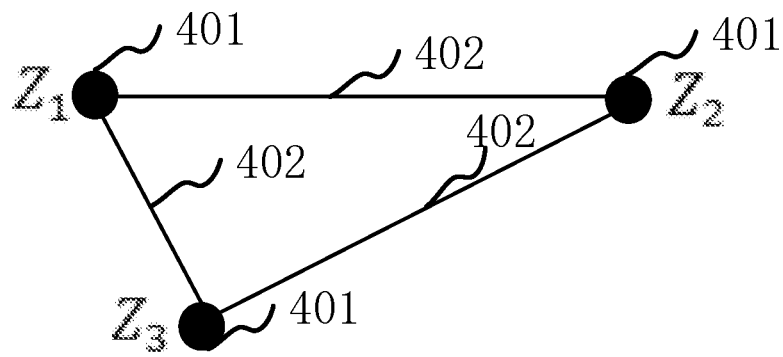
FIG. 4 is an exemplary diagram of a vector node according to an exemplary embodiment of the present disclosure.

As shown in FIG. 4, for example, the computer device generates regional word vectors of 3 dimensions of the target word vector: $Z_1$, $Z_2$, and $Z_3$, and the computer device determines $Z_1$, $Z_2$, and $Z_3$ as vector nodes 401 respectively. Edges 402 connected between the vector nodes represent relationships between two connected vector nodes. The computer device may calculate similarities between the vector nodes, and determine the similarities between the vector nodes as edge weights of edges between the corresponding vector nodes.

In an embodiment, the computer device may calculate and determine the edge weights between the regional word vectors according to the following formula: $W_{ij} = (Z_i^T Z_j)/(\|Z_i\| * \|Z_j\|)$, where either $Z_i$ or $Z_j$ is any regional word vector of the target word vector. $Z_i^T$ refers to a transposed vector of the regional word vector $Z_i$. "$\|Z_i\|$" refers to an L2 norm of the regional word vector $Z_i$, and "$\|Z_j\|$" refers to an L2 norm of the regional word vector $Z_j$. In this way, the computer device can obtain similarities between the vector nodes according to the foregoing formula, and determine the similarities between the vector nodes as edge weights of edges between the corresponding vector nodes, j being a positive integer.

S304. Generate an adjacency matrix jointly corresponding to the regional word vectors according to the determined edge weights.

The adjacency matrix is a matrix used for representing an adjacent relationship between vector nodes.

Specifically, the computer device may use the determined edge weights as matrix elements to form an adjacency matrix. For example, the computer device generates regional word vectors of N dimensions of the target word vector, then the computer device respectively determines the N regional word vectors as vector nodes, and calculates an edge weight between each two of the N vector nodes. In this way, an adjacency matrix A formed by the computer device by using the determined edge weights as matrix elements may be shown in FIG. 5.

S306. Respectively add up the edge weights of each dimension in the adjacency matrix to obtain a degree matrix.

The degree matrix refers to a matrix formed by degrees of vector nodes in each row or each column of the adjacency matrix. The degrees of the vector nodes in each row or each column is a sum of matrix elements included in each row or each column of the adjacency matrix.

Figures 5, 6, 7:
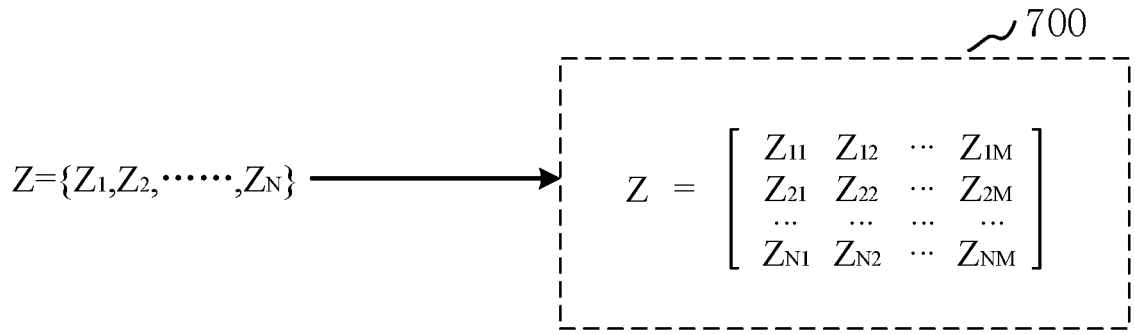
FIG. 5 is an exemplary diagram of an adjacency matrix according to an exemplary embodiment of the present disclosure.
FIG. 6 is an exemplary diagram of a degree matrix according to an exemplary embodiment of the present disclosure.
FIG. 7 is an exemplary diagram of a regional word vector matrix according to an exemplary embodiment of the present disclosure.

Specifically, as shown in FIG. 5, each row in the adjacency matrix A includes an edge weight of an edge between a vector node and another vector node. For example, $W_{12}$ in FIG. 5 may represent an edge weight of an edge between the first node and the second node in the vector nodes. After obtaining the adjacency matrix, the computer device may add up edge weights included in each row in the adjacency matrix, to obtain a degree of a vector node corresponding to each row. For example, the first row in the adjacency matrix includes edge weights between the vector node $Z_1$ and other vector nodes: $W_{11}$, $W_{12}$, $W_{13}$, . . . , and $W_{IN}$, then the computer device adds up $W_{11}$ to $W_{IN}$ to obtain a degree $D_{11}$ of the vector node $Z_1$.

Further, the computer device may calculate a degree of a vector node corresponding to each row according to the following formula: $D_{ii}=\Sigma_j W_{ij}$, where $W_{ij}$ refers to a matrix parameter (the matrix parameter is an edge weight between an $i^{th}$ vector node and a $j^{th}$ vector node among the vector nodes) in an $i^{th}$ row and $j^{th}$ column in the adjacency matrix. For example, when a degree of a vector node represented by the first row of the adjacency matrix A in FIG. 4 is calculated, j in $D_{11}=\Sigma_j W_{ij}$ is 1 to N, then $D_{11}=W_{11}+W_{12}+W_{13}+ \ldots +W_{IN}$.

The degrees of the vector nodes of rows in the adjacency matrix obtained by the computer device may be represented as: $D_{11}$, $D_{22}$, $D_{33}$, . . . , and $D_{NN}$, and the computer device may form a degree matrix D based on "$D_{11}$, $D_{22}$, $D_{33}$, . . . , and $D_{NN}$", other matrix elements than $D_{11}$, $D_{22}$, $D_{33}$ . . . . , and $D_{NN}$ in the formed degree matrix D are all 0, as shown in FIG. 6.

S308. Generate the combined regional word vectors of at least two dimensions based on the adjacency matrix and the degree matrix.

Specifically, the computer device may generate combined regional word vectors of the second preset dimension based on the obtained adjacency matrix and the degree matrix. In one embodiment, the quantity of the second preset dimensions is the same as the quantity of the regional word vectors of the target word vector.

In the foregoing embodiment, the computer device uses regional word vectors of the target word vector as vector nodes of a graph structure in a graph convolutional network, may calculate edge weights between the vector nodes, to obtain edge weights between the regional word vectors, use the obtained edge weights to generate the adjacency matrix, and calculate the degree matrix based on the adjacency matrix. In this way, the computer device may directly use the adjacency matrix and the degree matrix to efficiently generate the combined regional word vectors.

In an embodiment, the generating the combined regional word vectors of at least two dimensions based on the adjacency matrix and the degree matrix includes: determining a regional word vector matrix jointly corresponding to the regional word vectors: obtaining a second weight matrix used for generating a combined regional word vector matrix: and generating the combined regional word vector matrix according to the adjacency matrix, the degree matrix, the regional word vector matrix, and the second weight matrix, the combined regional word vector matrix including the regional word vectors of at least two dimensions.

The regional word vector matrix refers to a matrix in which vector elements included in the regional word vectors are used as matrix elements. The second weight matrix refers to a weight parameter in the form of a matrix in the graph convolutional network that is trained along with the system, and is used for generating the combined regional word vector matrix. In other words, the second weight matrix is a system parameter obtained by training the system by using sample data.

Specifically, the computer device uses the vector elements included in the regional word vectors as matrix elements to form a regional word vector matrix. For example, the computer device generates N regional word vectors $Z=\{Z_1, Z_2, \ldots, Z_N\}$ of the target word vector $X_T$, and each regional word vector includes M vector elements. The computer device uses vector elements included in each of the N regional word vectors Z as matrix elements, to form a regional word vector matrix Z. The regional word vector matrix Z is shown as 700 in FIG. 7, M being an integer.

The computer device obtains a second weight matrix Wg used for generating the combined regional word vector matrix, and generates a combined regional word vector matrix O according to the following formula: $O=\sigma(D^{-1/2}AD^{-1/2}ZW_g)$. D refers to the degree matrix, A refers to the adjacency matrix, Z refers to the regional word vector matrix, and $\sigma$ is an activation function. Further, the activation function $\sigma$ may be specifically a sigmoid function "sigmoid(x)". The sigmoid function is a common sigmoid function in biology, which is also referred to as a sigmoid growth curve. In one embodiment, the sigmoid function is used as a threshold function in the recurrent neural network.

The computer device may obtain the combined regional word vector matrix O of the same dimensions as the regional word vectors of the target word vector by using the activation function $\sigma$. Each row of the combined regional word vector matrix O is used as a dimension, and there is a combined regional word vector in each dimension. For example, the combined regional word vector matrix $$O = \begin{bmatrix} O_1 \\ O_2 \\ \ldots \\ O_J \end{bmatrix}$$

corresponding to N regional word vectors includes J combined regional word vectors, where J is equal to N.

Then the computer device may obtain J combined regional word vectors $O=\{O_1, O_2, \ldots, O_J\}$.

In the foregoing embodiment, the regional word vectors are used as a regional word vector matrix as a whole, the second weight matrix used for generating the combined regional word vector matrix is used to generate the combined regional word vector matrix corresponding to the regional word vector matrix based on the adjacency matrix and the degree matrix, and the generated combined regional word vector matrix includes regional word vectors of at least two dimensions, which further improves the efficiency of generating the combined regional word vectors.

Figure 8:
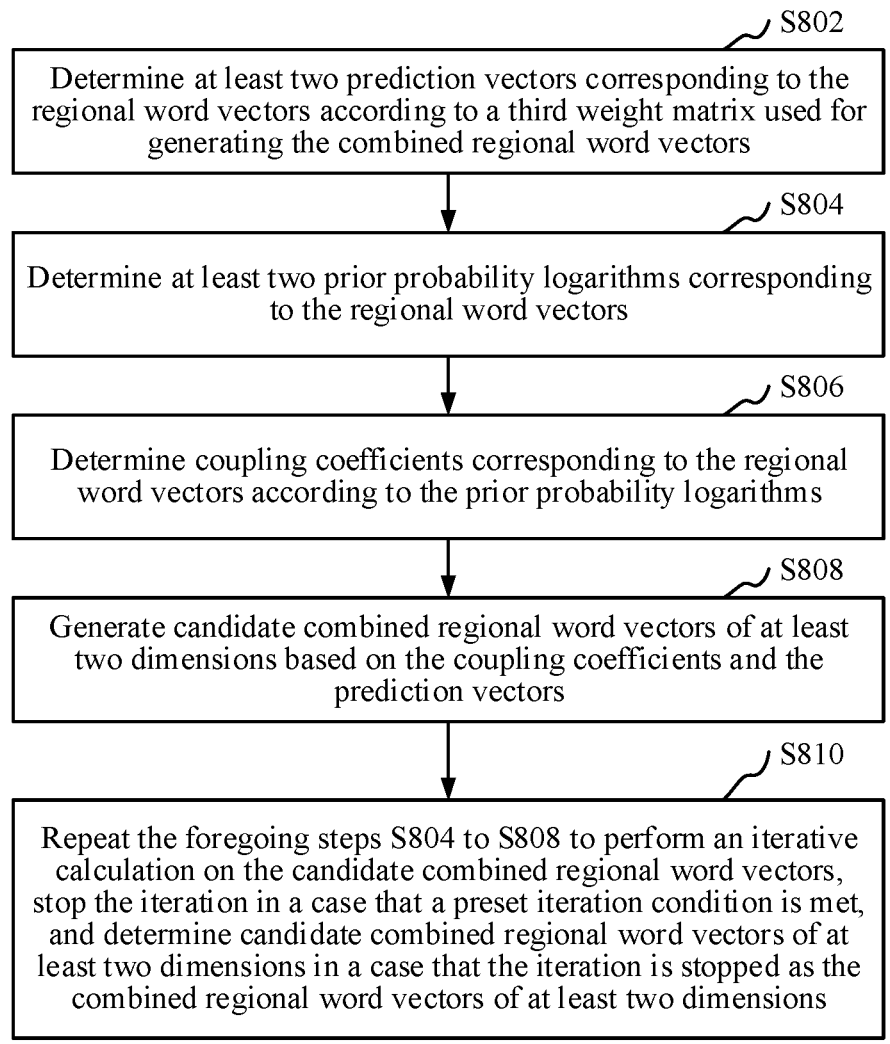
FIG. 8 is a flowchart of a method for generating a hidden state in a recurrent neural network for language processing according to another exemplary embodiment of the present disclosure.

In an embodiment, as shown in FIG. 8, the combining the regional word vectors to obtain combined regional word vectors of at least two dimensions includes:

S802. Determine at least two prediction vectors corresponding to the regional word vectors according to a third weight matrix used for generating the combined regional word vectors.

The third weight matrix refers to a weight parameter in the form of a matrix in a capsule network that is trained along with the system, and is used for generating the combined regional word vector matrix. In other words, the third weight matrix is a system parameter obtained by training the system by using sample data. The prediction vectors refer to intermediate variables in the form of vectors in the process of generating the combined regional word vector matrix.

Specifically, the regional vector combination manner preset in the computer device may be a regional vector combination manner based on the capsule network. The computer device uses the regional word vectors as capsules in the capsule network in the regional vector combination manner based on the capsule network. For example, the computer device generates N regional word vectors $Z=\{Z_1, Z_2, \ldots, Z_N\}$ of the target word vector, then there are N capsules: $Z_1, Z_2, \ldots,$ and $Z_N$.

The computer device obtains matrix elements $W^C_{ij}$ in the third weight matrix $W^C$ used for generating the combined regional word vectors, where i is 1 to N, N is a total quantity of capsules, and j is from 1 to the quantity of the second preset dimensions. In one embodiment, the quantity of the second preset dimensions is greater than or equal to 2 and less than or equal to N, and ij represents an $i^{th}$ row and a $j^{th}$ column of the third weight matrix $W^C$.

As shown in FIG. 9, 901-904 in FIG. 9 are an initialization stage of performing a combination calculation on the regional word vectors of the target word vector by the computer device in the regional vector combination manner based on the capsule network, and 905-910 are an iterative calculation stage of performing a combination calculation on the regional word vectors of the target word vector by the computer device in the regional vector combination manner based on the capsule network. At the initialization stage, as shown in 903 in FIG. 9, the computer device may generate prediction vectors $Z_{j|i}$ corresponding to matrix elements $W_1$ in the obtained third weight matrix based on the capsules in the capsule network.

S804. Determine at least two prior probability logarithms corresponding to the regional word vectors.

The prior probability logarithms refer to temporary variables in the form of vectors in the process of generating the combined regional word vector matrix.

Specifically, the computer device obtains prior probability logarithms $b_{ij}$ from a prior probability logarithm matrix B, and a quantity of prior probability logarithms $b_{ij}$ included in the prior probability logarithm matrix B is a product of a total quantity of capsules and the quantity of the second preset dimensions. As shown in 902 in FIG. 9, since it is at the initialization stage in this case, all the prior probability logarithms $b_{ij}$ in the prior probability logarithm matrix B are 0.

S806. Determine coupling coefficients corresponding to the regional word vectors according to the prior probability logarithms.

Specifically, the computer device enters the iterative calculation stage. At the iterative calculation stage, as shown in 905 in FIG. 9, the computer device normalizes the obtained prior probability logarithms $b_{ij}$ according to the formula as follows:

$$\text{softmax}(b_i) = \frac{\exp(b_{ij})}{\sum_k \exp(b_{ik})}.$$

Coupling coefficients $C_{ij}$ between the regional word vectors and the corresponding combined regional word vectors to be generated are respectively obtained, where exp( ) refers to an exponential function with e as the base.

S808. Generate candidate combined regional word vectors of at least two dimensions based on the coupling coefficients and the prediction vectors.

Specifically, after obtaining the coupling coefficients $C_{ij}$, as shown in 906 in FIG. 9, the computer device calculates a weighted sum $S_j$ according to the following formula: $S_j = \Sigma_i C_{ij} Z_{j|i}$, where $\Sigma$ is a sum symbol. As shown in 907 in FIG. 9, the computer device generates the combined regional word vectors $O_j$ of the second preset dimension by using a non-linear activation function squash($S_j$).

$$O_j = \text{squash}(S_j) = \frac{\|S_j\|^2}{1+\|S_j\|^2} \frac{S_j}{\|S_j\|},$$

where "$\|S_j\|$" means calculating a norm of $S_j$.

S810. Repeat the foregoing steps S804 to S808 to perform an iterative calculation on the candidate combined regional word vectors, stop the iteration (i.e., iterative calculation) when a preset iteration condition is met, and determine candidate combined regional word vectors of at least two dimensions when the iteration is stopped as the combined regional word vectors of at least two dimensions.

In other words, the computer device repeats the foregoing three steps S804 to S808 to perform an iterative calculation on the candidate combined regional word vectors, stops the iteration when a preset iteration condition is met, and determines candidate combined regional word vectors of at least two dimensions when the iteration is stopped as the combined regional word vectors of at least two dimensions.

When the iterative calculation is performed on the candidate combined regional word vectors, the prior probability logarithms between the regional word vectors and the combined regional word vectors need to be updated (e.g., at each iteration). Specifically, as shown in step 908 in FIG. 9, after obtaining the combined regional word vectors $O_j$, the computer device performs step 909 to redetermine the prior probability logarithms between the regional word vectors and the combined regional word vectors respectively according to the following formula: $b_{ij}=b_{ij}+Z_{j|i} \cdot O_j$.

Specifically, after redetermining the prior probability logarithms $b_{ij}$, return to the step 905 in FIG. 9, stop the iteration when a preset iteration condition is met, and output combined regional word vectors generated for the last time. Exemplarily, the preset iteration condition may be a preset quantity of iterations. For example, the preset quantity of iterations is 3, then the computer device stops the iteration when detecting that the current quantity of iterations has reached the preset quantity of iterations, and outputs combined regional word vectors generated for the third time.

For example, the preset quantity of iterations is 5, then the foregoing three steps S804 to S808 are repeated for five times. After steps S804 to S808 are performed for the fifth time, the repetition is stopped, and candidate combined regional word vectors obtained after steps S804 to S808 are performed for the fifth time are used as combined regional word vectors of at least two dimensions.

In the foregoing embodiment, the computer device uses the regional word vectors of the target word vector as capsules in the capsule network, uses the third weight matrix used for generating the combined regional word vectors in the capsule network to generate the at least two prediction vectors corresponding to the regional word vectors, and obtains the initialized at least two prior probability logarithms corresponding to the regional word vectors. In the process of generating the combined regional word vectors of at least two dimensions based on the prior probability logarithms, an iterative algorithm for the prior probability logarithms in the capsule network is used to generate the final combined regional word vectors more efficiently and accurately.

In other words, in the process of generating the combined regional word vectors of at least two dimensions based on the prior probability logarithms, the iterative algorithm for the prior probability logarithms in the capsule network is used, to efficiently perform the iterative calculation on the combined regional word vectors for many times, and to better capture the complex linguistic laws through a plurality of iterations.

In an embodiment, the determining at least two prior probability logarithms corresponding to the regional word vectors further includes: determining scalar products of the candidate combined regional word vectors and the corresponding prediction vectors: and adding up the scalar products and the corresponding prior probability logarithms, to obtain updated prior probability logarithms corresponding to the regional word vectors (e.g., for a current iteration).

Specifically, as shown in step 908 in FIG. 9, "$Z_{j|i} \cdot O_j$" refers to scalar products of the prediction vector $Z_{j|i}$ and the combined regional word vectors $O_j$. Then the obtained scalar products are respectively added up with the current prior probability logarithms to re-obtain a plurality of prior probability logarithms.

For example, prediction vectors $Z_{1|1}=(a_1, a_2, \ldots, a_n)$, the currently obtained combined regional word vectors $O_1=(c_1, c_2, \ldots, c_n)$, and correspondingly, the scalar products $Z_{1|1} \cdot O_1 = a_1 c_1 + a_2 c_2 + \ldots + a_n c_n$; the current $b_{11}$ and $Z_{1|1} \cdot O_1$ are added up to obtain new prior probability logarithms $b_{11} = b_{11} + Z_{1|1} \cdot O_1$.

In the foregoing embodiment, the computer device adds up the scalar products of the combined regional word vectors and the corresponding prediction vectors and the current prior probability logarithms, to obtain the plurality of updated prior probability logarithms. After a plurality of iterations, the prior probability logarithms are more accurate, so that the final combined regional word vectors can be generated more efficiently and accurately.

In an embodiment, the performing aggregation transformation processing on the combined regional word vectors based on a feedforward neural network, to obtain an aggregated word vector corresponding to the target word vector includes: transforming the combined regional word vectors based on the feedforward neural network, to obtain transformed combined regional word vectors: concatenating the transformed combined regional word vectors, to obtain a concatenated word vector; and performing linear transformation on the concatenated word vector, to obtain the aggregated word vector corresponding to the target word vector.

Specifically, the computer device performs deeper transformation on combined regional word vectors $O=\{O_1, O_2, \ldots, O_J\}$ according to a preset formula based on the feedforward neural network, and obtains transformed combined regional word vectors $F=\{f_1, f_2, \ldots, f_J\}$. The computer device concatenates all the transformed combined regional word vectors in F to obtain a concatenated word vector $(f_1\ f_2\ \ldots\ f_J)$. Then one linear transformation is performed on the concatenated word vector $(f_1\ f_2\ \ldots\ f_J)$ to obtain an aggregated word vector corresponding to the target word vector.

In the foregoing embodiment, the computer device performs the deeper transformation on the combined regional word vectors based on the feedforward neural network, to obtain the aggregated word vector, so that when the target hidden state generated based on the aggregated word vector is used to capture complex linguistic laws, the rate for capturing complex linguistic laws is high.

In an embodiment, the transforming the combined regional word vectors based on the feedforward neural network, to obtain transformed combined regional word vectors includes: performing linear transformation on the combined regional word vectors according to a fourth weight matrix and a first bias vector, to obtain temporary word vectors corresponding to the combined regional word vectors: respectively selecting maximum vector values in the temporary word vectors and a vector threshold; and respectively performing linear transformation on the maximum vector values according to a fifth weight matrix and a second bias vector, to obtain the transformed combined regional word vectors.

The fourth weight matrix refers to a weight parameter in the form of a matrix in the feedforward neural network that is trained along with the system, and is used for performing first linear transformation on the combined regional word vectors in the feedforward neural network. The fifth weight matrix refers to a weight parameter in the form of a matrix in the feedforward neural network that is trained along with the system, and is used for performing second linear transformation on the combined regional word vectors in the feedforward neural network. The first bias vector refers to a bias parameter in the form of a vector in the feedforward neural network that is trained along with the system, and is used for performing first linear transformation on the combined regional word vectors in the feedforward neural network. The second bias vector refers to a bias parameter in the form of a vector in the feedforward neural network that is trained along with the system, and is used for performing second linear transformation on the combined regional word vectors in the feedforward neural network. The fourth weight matrix and the fifth weight matrix are system parameters in the form of matrices obtained by training the system by using sample data.

Specifically, the computer device obtains a fourth weight matrix $W_1$ and a first bias vector $b_1$ in the feedforward neural network, and uses the fourth weight matrix $W_1$ and the first bias vector $b_1$ to perform the first linear transformation on the combined regional word vectors $O_j$: $O_j W_1 + b_1$, to obtain temporary word vectors corresponding to the combined regional word vectors. The temporary word vectors are compared with the vector threshold respectively, and the maximum vector values in the temporary word vectors and the vector threshold are selected.

For example, a vector threshold is 0, then the computer device respectively compares the temporary word vectors with the vector threshold 0, and selects maximum vector values $\max(0, O_j W_1 + b_1)$ by using a Relu function "$\max(0, X)$". A temporary word vector greater than the vector threshold 0 is used as a maximum vector value of the temporary word vector and the vector threshold 0, and the vector threshold 0 greater than a temporary word vector is used as a maximum vector value of the temporary word vector and the vector threshold 0.

The computer device obtains a fifth weight matrix $W_2$ and a second bias vector $b_2$ in the feedforward neural network, and uses the fifth weight matrix $W_2$ and the second bias vector $b_2$ to perform a second linear transformation on the combined regional word vectors $O_j$, to obtain the combined regional word vectors $f_J$ after the second linear transformation: $f_J$=max(0, $O_jW_1+b_1$) $W_2+b_2$, and further obtain the transformed combined regional word vectors F={$f_1$, $f_2$, ......,$f_J$}.

In the foregoing embodiment, the computer device uses the fourth weight matrix and the first bias vector in the feedforward neural network to perform the first linear transformation on the combined regional word vectors to obtain the temporary word vectors, selects the maximum vector values in the temporary word vectors and the vector threshold, and performs the second linear transformation on the maximum vector values by using the fifth weight matrix and the second bias vector in the feedforward neural network to obtain the transformed combined regional word vectors. The computer device may use the combined regional word vectors to generate the aggregated word vector, so that when the target hidden state generated based on the aggregated word vector is used to capture complex linguistic laws, the rate for capturing complex linguistic laws is high.

In an embodiment, the aggregated word vector includes a first aggregated word vector and a second aggregated word vector, the first aggregated word vector being different from the second aggregated word vector: and the generating a target hidden state corresponding to the target word vector based on the aggregated word vector includes: determining a candidate hidden state corresponding to the target word vector based on the first aggregated word vector and a corresponding first activation function: determining a gating parameter corresponding to the target word vector based on the second aggregated word vector and a corresponding second activation function: and generating the target hidden state corresponding to the target word vector according to the candidate hidden state, the gating parameter, and the historical hidden state of the historical word vector at the previous moment.

Specifically, when generating the regional word vectors of the target word vector, the computer device generates the aggregated word vector respectively based on the first weight matrix corresponding to the first aggregated word vector and the first weight matrix corresponding to the second aggregated word vector. When the computer device generates the regional word vectors based on the first weight matrix corresponding to the first aggregated word vector, the aggregated word vector corresponding to the target word vector that is finally obtained by the computer device is a first aggregated word vector $M_h$. When the computer device generates the regional word vectors based on the first weight matrix corresponding to the second aggregated word vector, the aggregated word vector corresponding to the target word vector that is finally obtained by the computer device is a second aggregated word vector $M_g$.

The computer device determines a candidate hidden state $h_{\sim t}$ of the target word vector by using a first activation function tanh: $h_{\sim t}$=tanh($M_h$). The computer device determines a gating parameter $g_t$ of the target word vector by using a second activation function σ: $g_t$=σ($M_g$).

Further, $\tanh(M_h) = \dfrac{2}{1+e^{-2M_h}} - 1 = 2 \text{ sigmoid } (2M_h) - 1$;

-continued
$$\sigma(M_g) = \text{sigmoid } (M_g) = \dfrac{1}{1+e^{-M_h}}.$$

After obtaining the candidate hidden state $h_{\sim t}$ and the gating parameter $g_t$ corresponding to the target word vector, the computer device calculates a target hidden state $h_t$ of the target word vector according to the following formula: $h_t$=(1−$g_t$)⊙$h_{t-1}$+$g_t$⊙$h_{\sim t}$. ⊙ is an element product operator, "(1−$g_t$)⊙$h_{t-1}$" means performing an element product operation on (1−$g_t$) and $h_{t-1}$, and "$g_t$ ⊙$h_{\sim t}$" means performing an element product operation on $g_t$ and $h_{\sim t}$.

In the foregoing embodiment, since the first aggregated word vector and the second aggregated word vector are both obtained by performing multi-dimensional conversion processing on the target word vector, the candidate hidden state obtained based on the first aggregated word vector and the gating parameter obtained based on the second aggregated word vector are more accurate. In this way, when the target hidden state obtained based on the more accurate candidate hidden state and gating parameter is used to capture complex linguistic laws, the rate for capturing complex linguistic laws is high.

Figure 10:
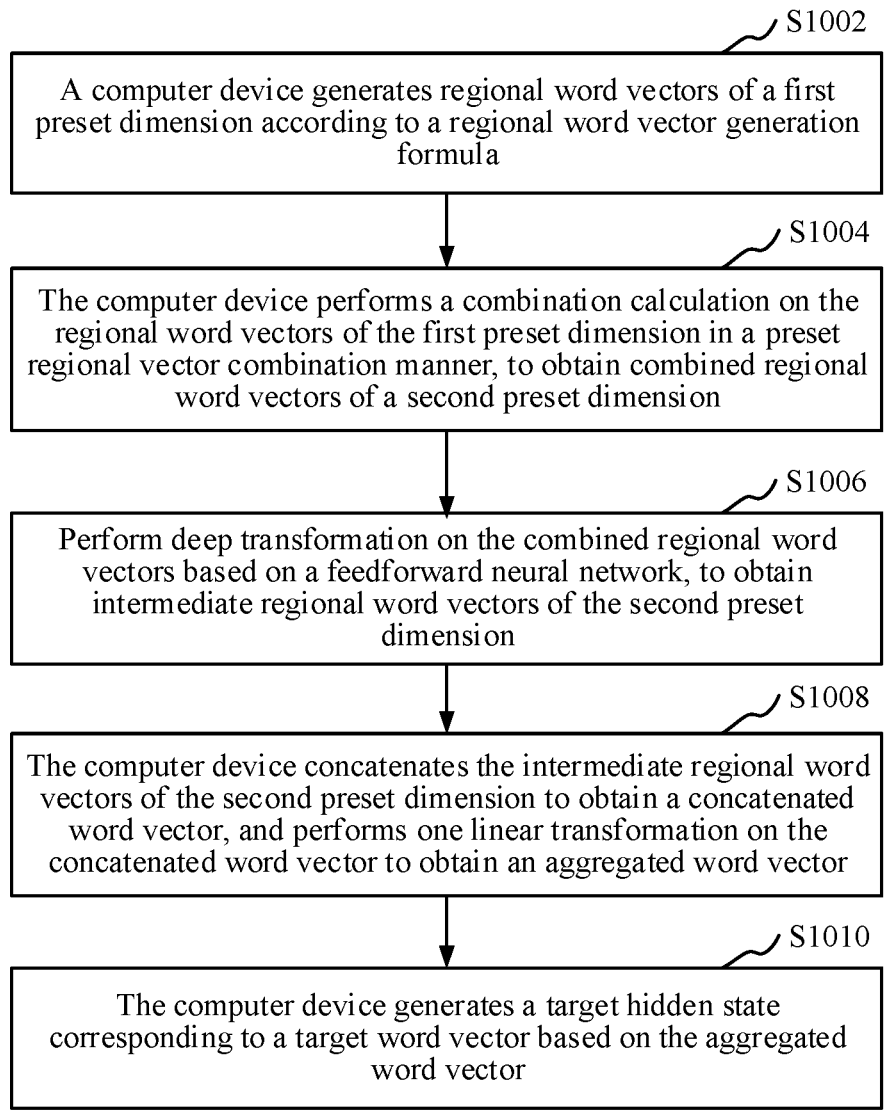
FIG. 10 is a flowchart of a method for generating a hidden state in a recurrent neural network for language processing according to another exemplary embodiment of the present disclosure.

In an embodiment, as shown in FIG. 10, the method for generating a hidden state in a recurrent neural network for language processing may include the following steps:

S1002. A computer device generates regional word vectors of a first preset dimension according to a regional word vector generation formula.

Figure 11:
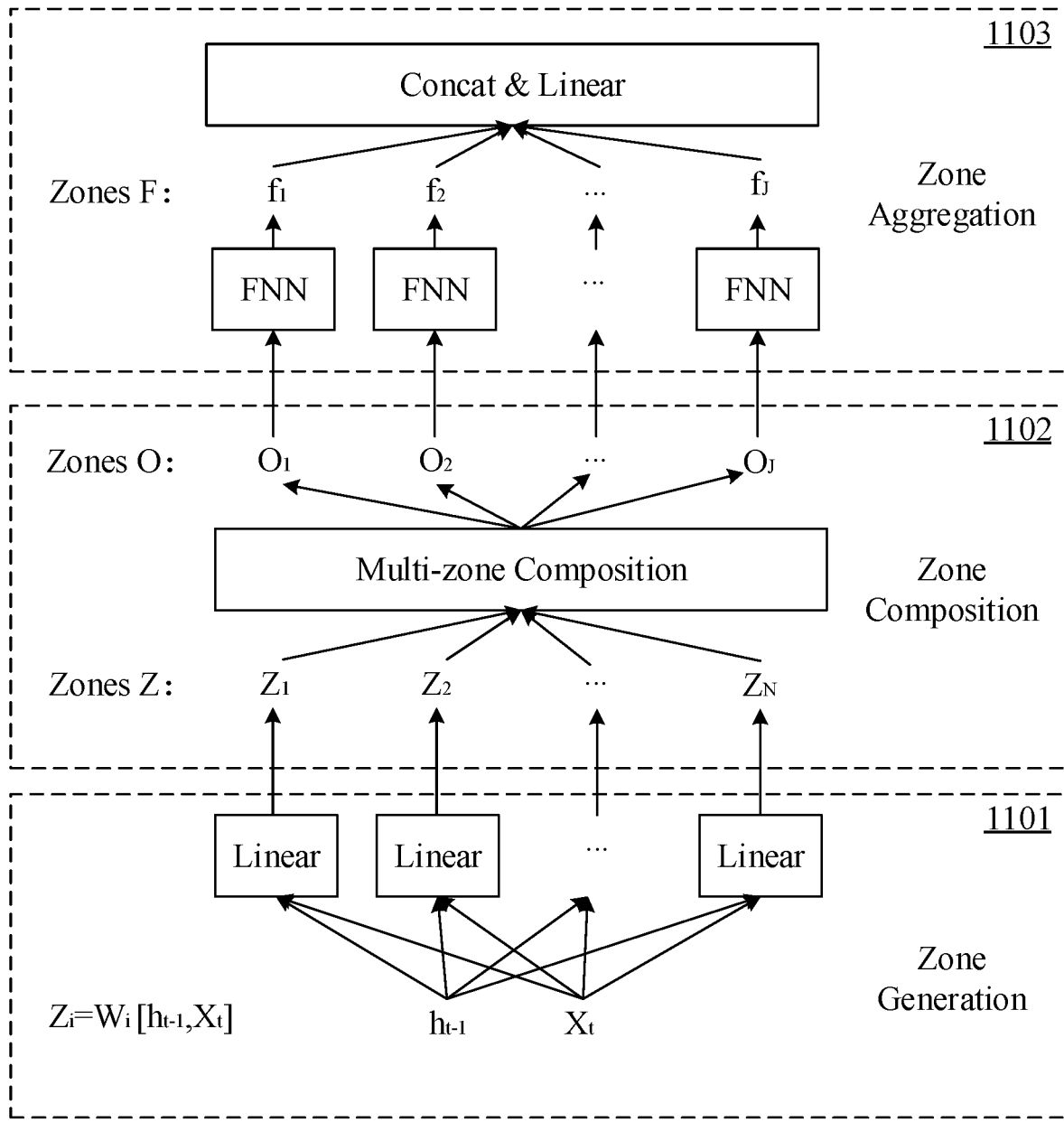
FIG. 11 is an exemplary diagram of a method for generating aggregated word vectors according to an exemplary embodiment of the present disclosure.

Specifically, as shown in 1101 in FIG. 11, the regional word vector generation formula is: $Z_i$=$W_i$[$X_t$, $h_{t-1}$]. For example, the first preset dimension is N, then i is 1 to N, and the regional word vectors of N dimensions obtained by the computer device may be represented as Z={$Z_1$, $Z_2$, ... ,$Z_N$}.

S1004. The computer device performs a combination calculation on the regional word vectors of the first preset dimension in a preset regional vector combination manner, to obtain combined regional word vectors of a second preset dimension.

Specifically, as shown in 1102 in FIG. 11, the computer device performs a combination calculation on the obtained regional word vector Z={$Z_1$, $Z_2$, ... ,$Z_N$} of N dimensions. For example, the second preset dimension is J, then the computer device may obtain J combined regional word vectors O={$O_1$, $O_2$, ...... ,$O_J$}. J may be equal to N or not equal to N. For example, when the preset regional vector combination manner is a regional vector combination manner based on graph convolution, the second preset dimension J is equal to the first preset dimension N. When the preset regional vector combination manner is a regional vector combination manner based on the capsule network, the second preset dimension J is greater than or equal to 2, and less than or equal to the first preset dimension N.

S1006: Perform deep transformation on the combined regional word vectors based on the feedforward neural network, to obtain intermediate regional word vectors of the second preset dimension.

Specifically, as shown in 1103 in FIG. 11, when processing the combined regional word vectors by using the feedforward neural network, the computer device may specifically generate the intermediate regional word vectors $f_J$ according to the following formula: $f_J$=max(0, $O_jW_1+b_1$) $W_2+b_2$. For example, the second preset dimension is J, then the computer device may generate J intermediate regional word vectors F={$f_1$, $f_2$, ... , $f_J$}.

S1008: The computer device concatenates the intermediate regional word vectors of the second preset dimension to obtain a concatenated word vector, and performs one linear transformation on the concatenated word vector to obtain an aggregated word vector.

Specifically, as shown in 1103 in FIG. 11, "Concat&Linear" means that the computer device concatenates the J intermediate regional word vectors F={$f_1$, $f_2$, . . . . . . ,$f_J$}, and then performs one linear transformation again.

S1010. The computer device generates a target hidden state corresponding to the target word vector based on the aggregated word vector.

Specifically, the aggregated word vector includes a first aggregated word vector $M_h$ and a second aggregated word vector $M_g$. The computer device may calculate the candidate hidden state hot and the gating parameter $g_t$ based on the first aggregated word vector $M_h$ and the second aggregated word vector $M_g$: the candidate hidden state $h_{\sim t}=\tanh(M_h)$, and the gating parameter $g_t=\sigma(M_g)$. In this way, the computer device may calculate the target hidden state ht of the target word vector based on the candidate hidden state het and the gating parameter $g_t$: the target hidden state $h_t=(1-g_t)\odot h_{t-1}+g_t\odot h_{\sim t}$.

In an embodiment, for example, in an application scenario of man-machine dialogs, the computer device receives variable-length voice information. The computer device converts voice information received at each moment into text information, maps the text information into a target word vector, and generates a target hidden state of each target word vector through the steps in the method for generating a hidden state in a recurrent neural network for language processing in any one of the foregoing embodiments.

The computer device may calculate an average hidden state of a plurality of generated target hidden states, and use the average hidden state as $h_{t-1}$, where $X_t$ is a 0 vector. The first aggregated word vector $M_h$ and the second aggregated word vector $M_g$ are calculated based on $h_{t-1}$ and $X_t$. The computer device calculates the candidate hidden state het and the gating parameter $g_t$ based on the first aggregated word vector $M_h$ and the second aggregated word vector $M_g$: the candidate hidden state $h_{\sim t}=\tanh(M_h)$, and the gating parameter $g_t=\sigma(M_g)$, and obtains an intermediate hidden state $h_t$ according to the formula $h_t=(1-g_t)\odot h_{t-1}+g_t\odot h_{\sim t}$. For example, the intermediate hidden state $h_t$ is a vector including 100 vector elements, then the intermediate hidden state $h_t$ may be multiplied by a weight matrix $W_v$ including 100*Y to obtain an intermediate vector including Y vector elements. By using softmax (an intermediate vector), Y probability values may be obtained, and each probability value represents a probability of a word in a corresponding word list. For example, Y is 10000, then the computer device may obtain 10000 probability values.

The computer device uses a word corresponding to a largest probability value among the Y probability values as a first word that the computer device needs to reply in the current man-machine dialog. The computer device uses a word vector of the first word that the computer device needs to reply as $X_t$, and the intermediate hidden state $h_t$ as $h_{t-1}$, and continues to perform the step of calculating the first aggregated word vector $M_h$ and the second aggregated word vector $M_g$ based on $h_{t-1}$ and $X_t$. According to the same calculation step, the computer device may obtain a second word, a third word, a fourth word, and so on that need to be replied. Until a maximum probability value obtained meets an end condition, the iteration ends. Further, the end condition may be that a word corresponding to the maximum probability value is a designated end symbol.

FIG. 2, FIG. 3, FIG. 8 and FIG. 10 are schematic flowcharts of a method for generating a hidden state in a recurrent neural network for language processing in an embodiment. It is to be understood that steps in flowcharts of FIG. 2, FIG. 3, FIG. 8 and FIG. 10 are displayed in sequence based on indication of arrows, but the steps are not necessarily performed in sequence based on a sequence indicated by the arrows. Unless otherwise explicitly specified in the present disclosure, execution of the steps is not strictly limited, and the steps may be performed in other sequences. In addition, at least some steps in FIG. 2, FIG. 3, FIG. 8, and FIG. 10 may include a plurality of substeps or a plurality of stages. The substeps or the stages are not necessarily performed at the same moment, and instead may be performed at different moments. The substeps or the stages are not necessarily performed sequentially, and instead may be performed in turn or alternately with another step or at least some of substeps or stages of the another step.

Figure 12:
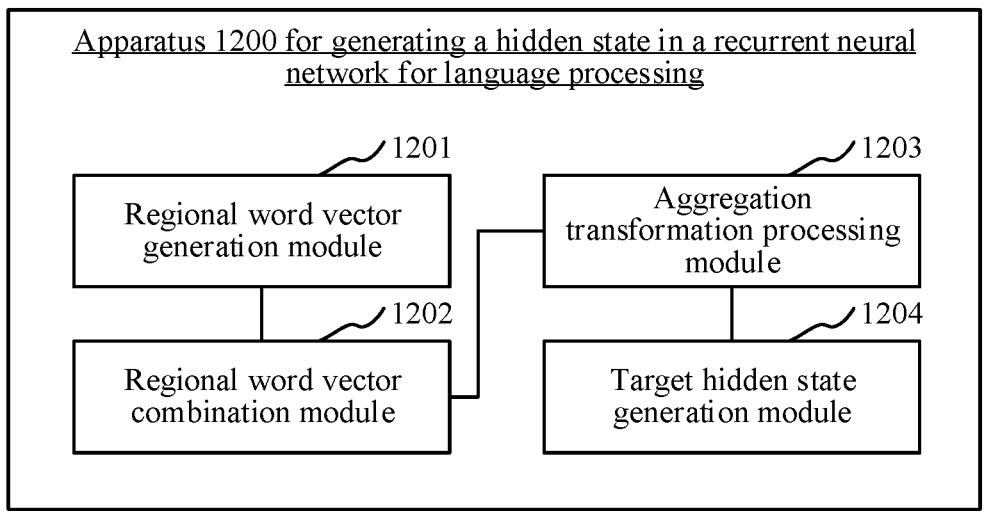
FIG. 12 is a structural block diagram of an apparatus for generating a hidden state in a recurrent neural network for language processing according to an exemplary embodiment of the present disclosure.

In an embodiment, as shown in FIG. 12, an apparatus 1200 for generating a hidden state in a recurrent neural network for language processing is provided. The apparatus may be implemented as a part or all of a computer device by using software, hardware, or a combination of the two. The apparatus includes a regional word vector generation module 1201, a regional word vector combination module 1202, an aggregation transformation processing module 1203, and a target hidden state generation module 1204.

The regional word vector generation module 1201 is configured to generate regional word vectors of at least two dimensions of a target word vector inputted at a first moment.

The regional word vector combination module 1202 is configured to combine the regional word vectors to obtain combined regional word vectors of at least two dimensions.

The aggregation transformation processing module 1203 is configured to perform aggregation transformation processing on the combined regional word vectors based on a feedforward neural network, to obtain an aggregated word vector corresponding to the target word vector.

The target hidden state generation module 1204 is configured to generate a target hidden state corresponding to the target word vector based on the aggregated word vector.

In an embodiment, the regional word vector generation module is further configured to: obtain at least two first weight matrices, each of the first weight matrices being used for generating a corresponding regional word vector: determine the target word vector inputted at the first moment, and obtain a historical hidden state corresponding to a historical word vector at a previous moment; and generate the regional word vectors of at least two dimensions of the target word vector based on the first weight matrices and the historical hidden state.

In an embodiment, the regional word vector generation module is further configured to: concatenate the target word vector and the historical hidden state to obtain a concatenated word vector; and generate a regional word vector matrix according to the concatenated word vector and the first weight matrices, the regional word vector matrix including the regional word vectors of at least two dimensions.

In an embodiment, the regional word vector combination module is further configured to: determine edge weights between the regional word vectors: generate an adjacency matrix jointly corresponding to the regional word vectors according to the determined edge weights; respectively add up the edge weights of each dimension in the adjacency matrix to obtain a degree matrix: and generate the combined regional word vectors of at least two dimensions based on the adjacency matrix and the degree matrix.

In an embodiment, the regional word vector combination module is further configured to: determine a regional word vector matrix jointly corresponding to the regional word vectors: obtain a second weight matrix used for generating a combined regional word vector matrix; and generate the combined regional word vector matrix according to the adjacency matrix, the degree matrix, the regional word vector matrix, and the second weight matrix, the combined regional word vector matrix including the regional word vectors of at least two dimensions.

In an embodiment, the regional word vector combination module is further configured to:
  determine at least two prediction vectors corresponding to the regional word vectors according to a third weight matrix used for generating the combined regional word vectors;
  determine at least two prior probability logarithms corresponding to the regional word vectors: determine coupling coefficients corresponding to the regional word vectors according to the prior probability logarithms: and generate candidate combined regional word vectors of at least two dimensions based on the coupling coefficients and the prediction vectors; and
  perform an iterative calculation on the candidate combined regional word vectors by starting from performing again the step of determining at least two prior probability logarithms corresponding to the regional word vectors, stop the iteration when a preset iteration condition is met, and determine candidate combined regional word vectors of at least two dimensions when the iteration is stopped as the combined regional word vectors of at least two dimensions.

In an embodiment, the regional word vector combination module is further configured to: determine scalar products of the candidate combined regional word vectors and the corresponding prediction vectors: and add up the scalar products and the corresponding prior probability logarithms, to obtain updated prior probability logarithms corresponding to the regional word vectors.

In an embodiment, the aggregation transformation processing module is further configured to: transform the combined regional word vectors based on the feedforward neural network, to obtain transformed combined regional word vectors: concatenate the transformed combined regional word vectors, to obtain a concatenated word vector; and perform linear transformation on the concatenated word vector, to obtain the aggregated word vector corresponding to the target word vector.

In an embodiment, the aggregation transformation processing module is further configured to: perform linear transformation on the combined regional word vectors according to a fourth weight matrix and a first bias vector, to obtain temporary word vectors corresponding to the combined regional word vectors: respectively select maximum vector values in the temporary word vectors and a vector threshold; and respectively perform linear transformation on the maximum vector values according to a fifth weight matrix and a second bias vector, to obtain the transformed combined regional word vectors.

In an embodiment, the aggregated word vector includes a first aggregated word vector and a second aggregated word vector, the first aggregated word vector being different from the second aggregated word vector.

The target hidden state generation module is further configured to: determine a candidate hidden state corresponding to the target word vector based on the first aggregated word vector and a corresponding first activation function: determine a gating parameter corresponding to the target word vector based on the second aggregated word vector and a corresponding second activation function; and generate the target hidden state corresponding to the target word vector according to the candidate hidden state, the gating parameter, and the historical hidden state of the historical word vector at the previous moment.

FIG. 1 is a diagram of an internal structure of a computer device in an embodiment. The computer device may be specifically a terminal or a server. As shown in FIG. 1, the computer device includes a processor, a memory, and a network interface connected by using a system bus. It can be understood that when the computer device is a terminal, the computer device may further include a display screen, an input apparatus, and the like. The memory includes a non-volatile storage medium and an internal memory. The non-volatile storage medium of the computer device stores an operating system, and may further store a computer program. The computer program, when executed by the processor, may cause the processor to implement the method for generating a hidden state in a recurrent neural network for language processing.

The internal memory may also store a computer program. The computer program, when executed by the processor, may cause the processor to perform the method for generating a hidden state in a recurrent neural network for language processing. When the computer device is a terminal, the display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art may understand that the structure shown in FIG. 1 is only a block diagram of a partial structure related to the solution of the present disclosure and does not constitute a limitation the computer device to which the solution of the present disclosure is applied. The computer device may specifically include more or fewer components than those shown in the figure, or some components may be combined, or a different component deployment may be used.

In an embodiment, the apparatus for generating a hidden state in a recurrent neural network for language processing provided in the present disclosure may be implemented in a form of a computer program. The computer program may run on the computer device shown in FIG. 1. The memory of the computer device may store various program modules that form the apparatus for generating a hidden state in a recurrent neural network for language processing, for example, the regional word vector generation module 1201, the regional word vector combination module 1202, the aggregation transformation processing module 1203, and the target hidden state generation module 1204 shown in FIG. 12. The computer program formed by the program modules causes the processor to perform the steps in the method for generating a hidden state in a recurrent neural network for language processing in the embodiments of the present disclosure described in this specification.

For example, the computer device shown in FIG. 1 may generate regional word vectors of at least two dimensions of a target word vector inputted at a first moment by using the regional word vector generation module 1201 in the apparatus 1200 for generating a hidden state in a recurrent neural network for language processing shown in FIG. 12. The computer device may combine the regional word vectors to obtain combined regional word vectors of at least two dimensions by using the regional word vector combination module 1202. The computer device may perform aggregation transformation processing on the combined regional word vectors based on a feedforward neural network, to obtain an aggregated word vector corresponding to the target word vector by using the aggregation transformation processing module 1203. The computer device may generate a target hidden state corresponding to the target word vector based on the aggregated word vector by using the target hidden state generation module 1204.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an embodiment, a computer device is provided, including a memory and a processor, the memory storing a computer program, the computer program, when executed by the processor, causing the processor to perform the steps of the foregoing method for generating a hidden state in a recurrent neural network for language processing. The steps of the method for generating a hidden state in a recurrent neural network for language processing herein may be the steps of the method for generating a hidden state in a recurrent neural network for language processing in the foregoing embodiments.

In an embodiment, a computer-readable storage medium is provided, storing a computer program, the computer program, when executed by a processor, causing the processor to perform the steps of the foregoing method for generating a hidden state in a recurrent neural network for language processing. The steps of the method for generating a hidden state in a recurrent neural network for language processing herein may be the steps of the method for generating a hidden state in a recurrent neural network for language processing in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable read-only memory (PROM), an electrically programmable read-only memory (EPROM), an electrically erasable programmable read-only memory (EEPROM) or a flash memory. The volatile memory may include a random access memory (RAM) or an external high-speed cache. As an illustration and not a limitation, a RAM is available in many forms, such as a static random access memory (SRAM), a dynamic random access memory (DRAM), a synchronous dynamic random access memory (SDRAM), a double data rate SDRAM (DDR SDRAM), an enhanced SDRAM (ESDRAM), a synchLink DRAM (SLDRAM), a rambus DRAM (RDRAM), and a direct rambus DRAM (DRDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several preset implementations of the present disclosure, and descriptions thereof are in detail, but cannot be understood as a limitation to the patent scope of the present disclosure. A person of ordinary skill in the art can still make several transformations and improvements without departing from the idea of the present disclosure. These transformations and improvements all fall within the protection scope of the present disclosure. Therefore, the protection scope of the patent of the present disclosure shall be subject to the appended claims.

What is claimed is:

1. A method for generating a hidden state in a recurrent neural network for sequentially inputted language processing, applied to a computer device, the method comprising:
    generating regional word vectors of at least two dimensions of a target word vector inputted at a first moment based on at least two first weight matrices and a second hidden state corresponding to a second word vector inputted at a second moment being earlier than the first moment in time, each of the first weight matrices being used for generating a corresponding regional word vector;
    combining the regional word vectors in a preset regional vector combination manner to obtain combined regional word vectors of the at least two dimensions, wherein the preset regional vector combination manner includes a graph convolution network combination manner for processing the regional word vectors as vector nodes in a graph convolution network or a capsule network combination manner for processing the regional word vectors as capsules in a capsule network;
    performing aggregation transformation processing on the combined regional word vectors based on a feedforward neural network, to obtain an aggregated word vector corresponding to the target word vector; and
    generating a target hidden state corresponding to the target word vector based on the aggregated word vector.

2. The method according to claim 1, wherein the generating the regional word vectors of the at least two dimensions of the target word vector based on the at least two first weight matrices and the second hidden state corresponding to the second word vector inputted at the second moment being earlier than the first moment in time comprises:
    concatenating the target word vector and the second hidden state to obtain a concatenated word vector; and
    generating a regional word vector matrix according to the concatenated word vector and the at least two first weight matrices, the regional word vector matrix comprising the regional word vectors of the at least two dimensions.

3. The method according to claim 1, wherein the combining the regional word vectors in the graph convolution network combination manner to obtain combined regional word vectors of the at least two dimensions comprises:

determining edge weights between the regional word vectors, each edge weight corresponding to two of the regional word vectors;

generating an adjacency matrix corresponding to the regional word vectors according to the determined edge weights;

respectively adding up the edge weights of each dimension in the adjacency matrix to obtain a degree matrix; and generating the combined regional word vectors of the at least two dimensions based on the adjacency matrix and the degree matrix.

4. The method according to claim 3, wherein the generating the combined regional word vectors of at least two dimensions based on the adjacency matrix and the degree matrix comprises:

determining a regional word vector matrix corresponding to the regional word vectors;

obtaining a second weight matrix used for generating a combined regional word vector matrix; and generating the combined regional word vector matrix according to the adjacency matrix, the degree matrix, the regional word vector matrix, and the second weight matrix, the combined regional word vector matrix comprising the regional word vectors of the at least two dimensions.

5. The method according to claim 1, wherein the combining the regional word vectors in the capsule network combination manner to obtain combined regional word vectors of the at least two dimensions comprises:

performing operations of:
determining at least two prediction vectors corresponding to the regional word vectors according to a third weight matrix used for generating the combined regional word vectors;

determining at least two prior probability logarithms corresponding to the regional word vectors;

determining coupling coefficients corresponding to the regional word vectors according to the at least two prior probability logarithms; and generating candidate combined regional word vectors of the at least two dimensions based on the coupling coefficients and the at least two prediction vectors; and performing an iterative calculation on the candidate combined regional word vectors by performing again the operations starting from determining the at least two prior probability logarithms corresponding to the regional word vectors, stopping the iterative calculation when a preset iteration condition is met, and determining the candidate combined regional word vectors of the at least two dimensions when the iterative calculation is stopped as the combined regional word vectors of the at least two dimensions.

6. The method according to claim 5, wherein the determining at least two prior probability logarithms corresponding to the regional word vectors further comprises:

determining scalar products of the candidate combined regional word vectors and the corresponding prediction vectors; and adding up the scalar products and the corresponding prior probability logarithms, to obtain updated prior probability logarithms corresponding to the regional word vectors.

7. The method according to claim 1, wherein the performing aggregation transformation processing on the combined regional word vectors based on a feedforward neural network, to obtain an aggregated word vector corresponding to the target word vector comprises:

transforming the combined regional word vectors based on the feedforward neural network, to obtain transformed combined regional word vectors;

concatenating the transformed combined regional word vectors, to obtain a concatenated word vector; and performing linear transformation on the concatenated word vector, to obtain the aggregated word vector corresponding to the target word vector.

8. The method according to claim 7, wherein the transforming the combined regional word vectors based on the feedforward neural network, to obtain transformed combined regional word vectors comprises:

performing linear transformation on the combined regional word vectors according to a fourth weight matrix and a first bias vector, to obtain temporary word vectors corresponding to the combined regional word vectors;

respectively selecting maximum vector values in the temporary word vectors and a vector threshold; and respectively performing linear transformation on the maximum vector values according to a fifth weight matrix and a second bias vector, to obtain the transformed combined regional word vectors.

9. The method according to claim 1, wherein the aggregated word vector comprises a first aggregated word vector and a second aggregated word vector, the first aggregated word vector being different from the second aggregated word vector; and the generating a target hidden state corresponding to the target word vector based on the aggregated word vector comprises:

determining a candidate hidden state corresponding to the target word vector based on the first aggregated word vector and a corresponding first activation function;

determining a gating parameter corresponding to the target word vector based on the second aggregated word vector and a corresponding second activation function; and generating the target hidden state corresponding to the target word vector according to the candidate hidden state, the gating parameter, and the historical hidden state of the historical word vector at the previous moment.

10. An apparatus for generating a hidden state in a recurrent neural network for language processing, the apparatus comprising a memory and a processor, the memory storing a computer program, the computer program, when executed by the processor, causing the processor to:

generate regional word vectors of at least two dimensions of a target word vector inputted at a first moment based on at least two first weight matrices and a second hidden state corresponding to a second word vector inputted at a second moment being earlier than the first moment in time, each of the first weight matrices being used for generating a corresponding regional word vector;

combine the regional word vectors in a preset regional vector combination manner to obtain combined regional word vectors of the at least two dimensions, wherein the preset regional vector combination manner includes a graph convolution network combination manner for processing the regional word vectors as vector nodes in a graph convolution network or a capsule network combination manner for processing the regional word vectors as capsules in a capsule network;

perform aggregation transformation processing on the combined regional word vectors based on a feedforward neural network, to obtain an aggregated word vector corresponding to the target word vector; and generate a target hidden state corresponding to the target word vector based on the aggregated word vector.

11. The apparatus according to claim 10, wherein the processor is further configured to:

concatenate the target word vector and the second hidden state to obtain a concatenated word vector; and generate a regional word vector matrix according to the concatenated word vector and the at least two first weight matrices, the regional word vector matrix comprising the regional word vectors of the at least two dimensions.

12. The apparatus according to claim 10, wherein the processor is further configured to:

determine edge weights between the regional word vectors, each edge weight corresponding to two of the regional word vectors;

generate an adjacency matrix corresponding to the regional word vectors according to the determined edge weights;

respectively add up the edge weights of each dimension in the adjacency matrix to obtain a degree matrix; and generate the combined regional word vectors of the at least two dimensions based on the adjacency matrix and the degree matrix.

13. The apparatus according to claim 12, wherein the processor is further configured to:

determine a regional word vector matrix corresponding to the regional word vectors;

obtain a second weight matrix used for generating a combined regional word vector matrix; and generate the combined regional word vector matrix according to the adjacency matrix, the degree matrix, the regional word vector matrix, and the second weight matrix, the combined regional word vector matrix comprising the regional word vectors of the at least two dimensions.

14. The apparatus according to claim 10, wherein the processor is further configured to:

perform operations of:

determining at least two prediction vectors corresponding to the regional word vectors according to a third weight matrix used for generating the combined regional word vectors;

determining at least two prior probability logarithms corresponding to the regional word vectors;

determining coupling coefficients corresponding to the regional word vectors according to the at least two prior probability logarithms; and generating candidate combined regional word vectors of the at least two dimensions based on the coupling coefficients and the at least two prediction vectors; and perform an iterative calculation on the candidate combined regional word vectors by performing again the operations starting from determining the at least two prior probability logarithms corresponding to the regional word vectors, stop the iterative calculation when a preset iteration condition is met, and determine candidate combined regional word vectors of the at least two dimensions when the iterative calculation is stopped as the combined regional word vectors of the at least two dimensions.

15. The apparatus according to claim 14, wherein the processor is further configured to:

determine scalar products of the candidate combined regional word vectors and the corresponding prediction vectors; and add up the scalar products and the corresponding prior probability logarithms, to obtain updated prior probability logarithms corresponding to the regional word vectors.

16. The apparatus according to claim 10, wherein the processor is further configured to:

transform the combined regional word vectors based on the feedforward neural network, to obtain transformed combined regional word vectors;

concatenate the transformed combined regional word vectors, to obtain a concatenated word vector; and perform linear transformation on the concatenated word vector, to obtain the aggregated word vector corresponding to the target word vector.

17. The apparatus according to claim 16, wherein the processor is further configured to:

perform linear transformation on the combined regional word vectors according to a fourth weight matrix and a first bias vector, to obtain temporary word vectors corresponding to the combined regional word vectors;

respectively select maximum vector values in the temporary word vectors and a vector threshold; and respectively perform linear transformation on the maximum vector values according to a fifth weight matrix and a second bias vector, to obtain the transformed combined regional word vectors.

18. A non-transitory computer-readable storage medium, storing a computer program, the computer program, when executed by a processor, causing the processor to perform:

generating regional word vectors of at least two dimensions of a target word vector inputted at a first moment based on at least two first weight matrices and a second hidden state corresponding to a second word vector inputted at a second moment being earlier than the first moment in time, each of the first weight matrices being used for generating a corresponding regional word vector;

combining the regional word vectors in a preset regional vector combination manner to obtain combined regional word vectors of the at least two dimensions, wherein the preset regional vector combination manner includes a graph convolution network combination manner for processing the regional word vectors as vector nodes in a graph convolution network or a capsule network combination manner for processing the regional word vectors as capsules in a capsule network;

performing aggregation transformation processing on the combined regional word vectors based on a feedforward neural network, to obtain an aggregated word vector corresponding to the target word vector, and generating a target hidden state corresponding to the target word vector based on the aggregated word vector.

* * * * *